(12) United States Patent
Chiu

(10) Patent No.: US 8,736,184 B2
(45) Date of Patent: May 27, 2014

(54) BALLAST STRUCTURE USED FOR HIGH-INTENSITY DISCHARGE LAMP

(76) Inventor: Shih-Yung Chiu, Sindian (TW)

( * ) Notice: Subject to any disclaimer, the term of this patent is extended or adjusted under 35 U.S.C. 154(b) by 231 days.

(21) Appl. No.: 13/441,310

(22) Filed: Apr. 6, 2012

(65) Prior Publication Data

US 2012/0256552 A1 Oct. 11, 2012

(30) Foreign Application Priority Data

Apr. 7, 2011 (TW) .............................. 100206116 A

(51) Int. Cl.
*H05B 41/36* (2006.01)
(52) U.S. Cl.
USPC ...................................... 315/200 R
(58) Field of Classification Search
None
See application file for complete search history.

(56) References Cited

U.S. PATENT DOCUMENTS 8,362,713 B2 * 1/2013 Recker et al. ................. 315/293

* cited by examiner

*Primary Examiner* — Crystal L Hammond
(74) *Attorney, Agent, or Firm* — Bacon & Thomas, PLLC

(57) ABSTRACT

Disclosed is a ballast structure on which a high-intensity discharge lamp (HID lamp) can be installed and which can light the HID lamp; the ballast structure is provided with a base and an HID lamp seat provided on the base, and the base is provided with a direct-current (DC) boost circuit, an alternating-current (AC) rectifier circuit and an ignition circuit, all of which circuits are arranged to form a circuit functioning as a ballast; the HID lamp seat is provided with positive-electrode and negative-electrode contact ends electrically connected to positive-electrode and negative-electrode output ends of the AC rectifier circuit and of the ignition circuit of the base; and the HID lamp installed on the ballast structure can be lit and kept in normal operation by a DC current.

10 Claims, 6 Drawing Sheets

BALLAST STRUCTURE USED FOR HIGH-INTENSITY DISCHARGE LAMP

BACKGROUND OF THE PRESENT INVENTION

1. Field of the Present Invention

The present invention relates to a ballast structure, more particularly to a ballast structure capably provided for high-intensity discharge lamp directly installed therein.

2. Description of Prior Act

A known high-intensity discharge lamp (hereinafter abbreviated as HID lamp) 80 is referred to FIG. 1. The principle to actuate the HID lamp 80 capably to emit light is briefly stated as follows. The HID lamp 80 comprises a quartz inner tube which is filled with an inert gas, e.g., Xenon. When the inert gas is ionized by a voltage as high as 23000V (or 23 kV), an electric arc is generated to produce light.

Due to discharge through ionized gas, the HID lamp 80 does not generate high heat. As long as only a few inert gases are still existed in the quartz inner tube, the HID lamp 80 can emit light constantly. Therefore, if compared with other lamps, the HID lamp 80 is less prone to damage, is capable of providing much brighter illumination over a wider angle, and has a longer service life.

However, since the gas-discharge light-emitting mechanism of the HID lamp 80 has a characteristic of negative resistance, the voltage in the HID lamp 80 does not increase but decreases as the current increases, and vice versa. If directly connected to a voltage source, the HID lamp 80 will burn once the current surges beyond its limit. In order to overcome the negative resistance of the HID lamp 80, it is required that a ballast 10 be connected in series in the circuit of the HID lamp 80, wherein the ballast 10 limits the current through the HID lamp 80 and thereby allows the HID lamp 80 to operate normally.

The HID lamp 80 can use a direct-current (DC) or alternating-current (AC) power source. As shown in FIG. 2, when a DC power source is used, the ballast 10 to be series-connected to the HID lamp 80 is connected to the DC power source by a power input cord 12 and is connected to a HID lamp seat 20 by a power output cord 14. Once the HID lamp 80 is installed on the HID lamp seat 20, the ballast 10 can convert DC power into a boosted AC power and supplies the AC power to the HID lamp 80, so as for the HID lamp 80 to emit light by gas discharge.

Conventionally, the circuit of the ballast 10 at least includes a DC boost circuit 10a, an AC rectifier circuit 10b, and an ignition circuit 10c, all of which circuits are arranged to form a circuit that provides the function of a ballast. The DC boost circuit 10a is connected to the AC rectifier circuit 10b and, as required by operation of the HID lamp 80, can boost the DC power obtained through the power input cord 12, such as a 12V DC power, to the desired voltage, which is supplied to the AC rectifier circuit 10b connected to the output end of the DC boost circuit 10a. The AC rectifier circuit 10b then converts the boosted DC power into AC power by DC/AC voltage conversion. The AC power is supplied to the ignition circuit 10c so that voltage is instantly raised to 23 kV to start and light the HID lamp 80. In addition, the AC power provides a stable AC voltage and current to the HID lamp 80 to sustain gas discharge in, and hence normal operation of, the lit HID lamp 80.

The conventional ballast 10 and HID lamp seat 20 are two independent components that are separately designed. This causes inconvenience of use, given the current design trend toward lightweight and compactness.

SUMMARY OF THE INVENTION

In view of the above, the primary object of the present invention is to provide an integrated ballast structure which incorporates an HID lamp seat with a ballast component that jointly provide the function of a ballast. Thus, the ballast structure of the invention not only can be directly connected with an HID lamp but also allows the HID lamp to be lit by a DC current.

The ballast structure disclosed herein includes a base, and the base is provided with a DC boost circuit, an AC rectifier circuit, and an ignition circuit, all of which circuits are arranged to form a circuit that provides the function of a ballast. In addition, the base is provided with an HID lamp seat, which is composed of a fastening seat, an electrode contact plate, and an electrode insertion hole. The fastening seat forms a receiving space in which an HID lamp can be installed. The electrode contact plate and the electrode insertion hole are elements of opposite polarities, namely a positive-electrode element and a negative-electrode element. The electrode contact plate and the electrode insertion hole are electrically connected to the positive-electrode and negative-electrode output ends of the AC rectifier circuit of the base.

In the disclosed ballast structure, the base is further provided with a control circuit for detecting the working condition of the HID lamp and adjusting the output voltage and the output current of the AC rectifier circuit in a timely manner accordingly, so as to keep the HID lamp in normal operation.

In the disclosed ballast structure, the base may be shaped as a cylinder, a triangular prism, a rectangular prism, or other polygonal prisms according to practical needs, such as to fit into the barrel of an HID flashlight.

In the disclosed ballast structure, the exposed portion of the base may be provided with a power input port as needed, wherein the power input port is electrically connected to the positive- and negative-electrode input ends of the DC boost circuit of the base to facilitate connection with a DC power source.

In the disclosed ballast structure, the fastening seat of the HID lamp seat has a top surface provided with two or more longitudinal grooves for securing the HID lamp. Additionally, the lateral surface of the fastening seat of the HID lamp seat is provided with transverse fastening grooves that communicate with the longitudinal grooves respectively.

The disclosed ballast structure serves the dual function of allowing direct HID lamp installation and lighting the installed HID lamp. Furthermore, the disclosed ballast structure can light the HID lamp installed thereon and maintain normal operation of the HID lamp with a DC current.

BRIEF DESCRIPTION OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE PREFERRED EMBODIMENTS

As shown in FIGS. 3 to 9, a ballast structure 30 of the present invention includes a base 31 and an HID lamp seat 32 provided on the base 31. The ballast structure 30 not only allows an HID lamp 80 to be directly installed thereon but also can light the HID lamp 80.

Figure 1:
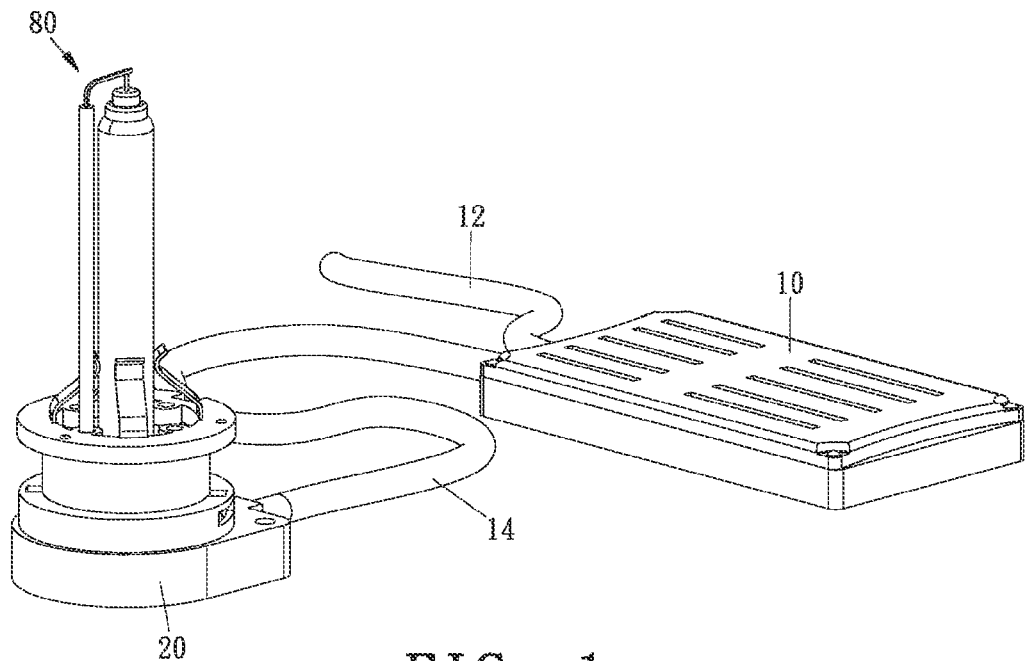
FIG. 1 is a perspective view to illustrate that an HID lamp must be used in conjunction with a ballast in order to operate normally.
Figure 2:
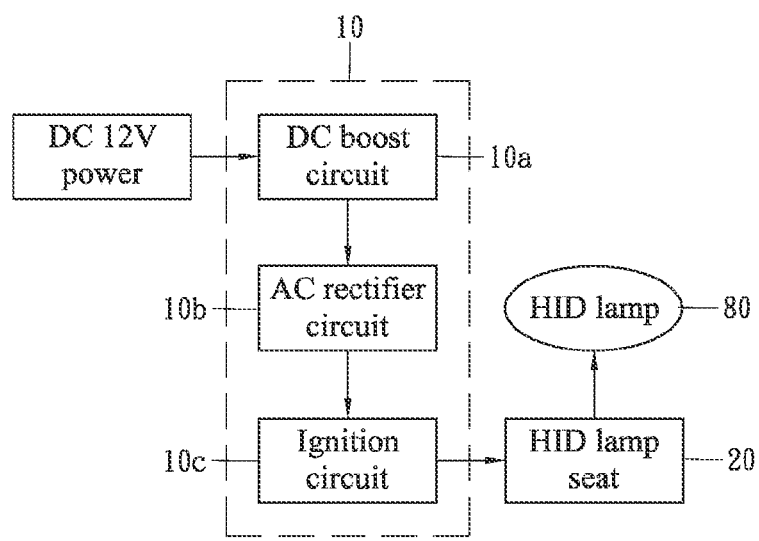
FIG. 2 is a circuit block diagram of an HID lamp connected with a ballast.
Figure 3:
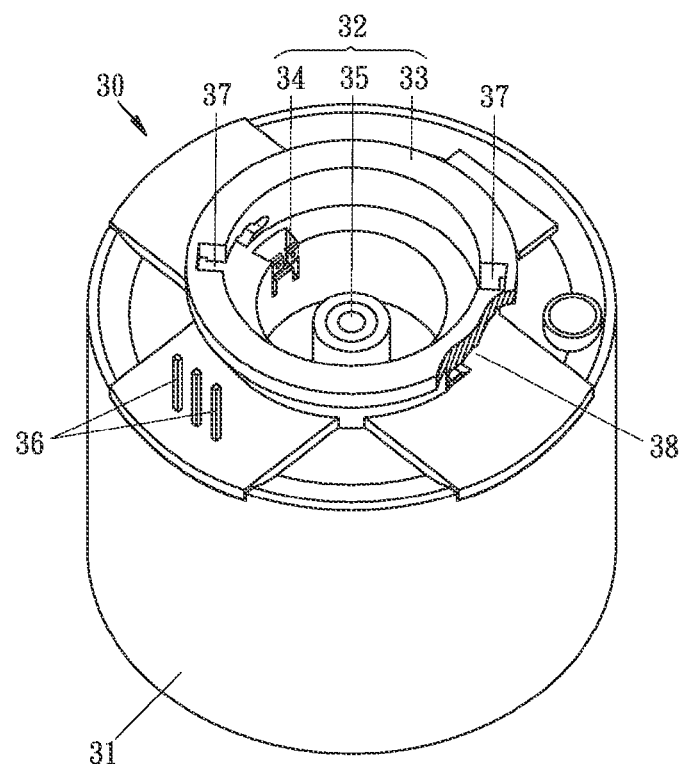
FIG. 3 is a perspective view of a ballast structure of the present invention to show the ballast has an HID lamp seat.
Figure 4:
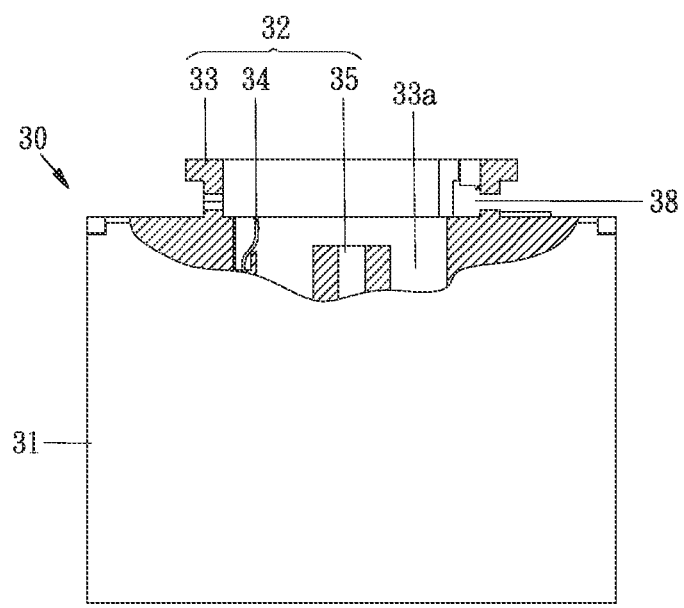
FIG. 4 is a partially sectional front view of the ballast structure depicted in FIG. 3.
Figure 5:
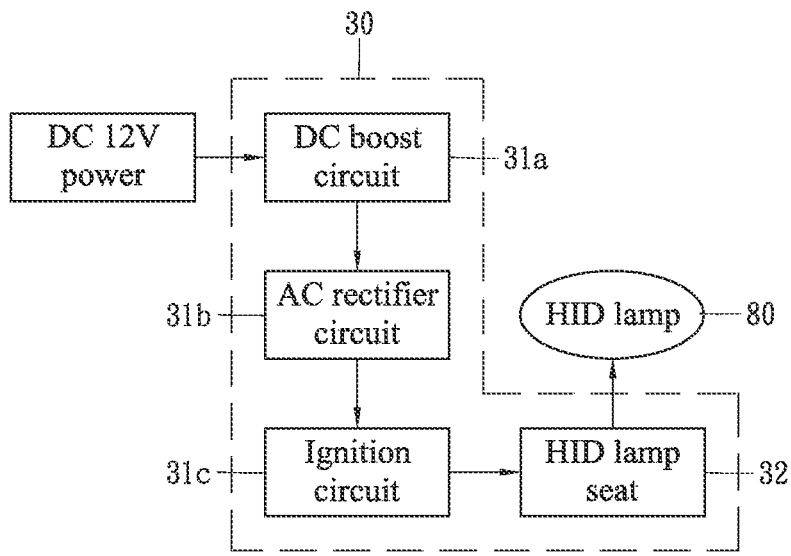
FIG. 5 is a circuit block diagram of the ballast structure depicted in FIG. 3.

Referring to FIGS. 3 and 4, the base 31 may be shaped as a cylinder, a triangular prism, a rectangular prism, or other polygonal prisms, and is preferably cylindrical. Moreover, as shown in FIG. 5, the base 31 is provided with a DC boost circuit 31a, an AC rectifier circuit 31b, and an ignition circuit 31c, all of which circuits are arranged to form a circuit that functions as a ballast. The working principles of the DC boost circuit 31a, the AC rectifier circuit 31b, and the ignition circuit 31c are the same as those of their counterparts in the conventional ballast 10 and therefore will not be described repeatedly.

Figure 6:
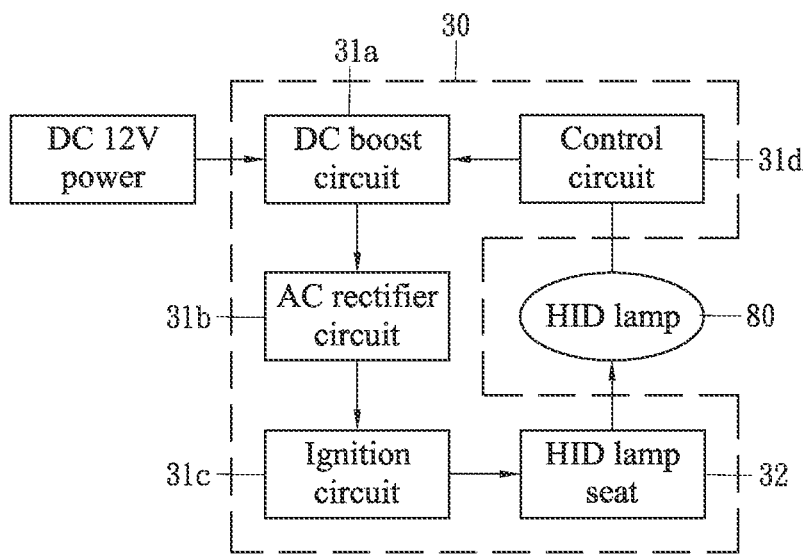
FIG. 6 is another circuit block diagram of the ballast structure depicted in FIG. 3.

Referring to FIG. 6, the base 31 in another embodiment includes a control circuit 31d in addition to the DC boost circuit 31a, the AC rectifier circuit 31b and the ignition circuit 31c. The control circuit 31d is configured for detecting the working condition of the HID lamp 80 and can adjust the output voltage and the output current of the AC rectifier circuit 31b in a timely manner according to the working condition of the HID lamp 80, so as to maintain the efficiency and stability of the HID lamp 80.

As shown in FIG. 3, the base 31 is provided with a power input port 36 which is exposed to view and is electrically connected to the positive-electrode and negative-electrode input ends of the DC boost circuit 31a in the base 31. The power input port 36 serves to connect with a power source connector (not shown) and thereby enable power input from a DC power source.

Figure 7:
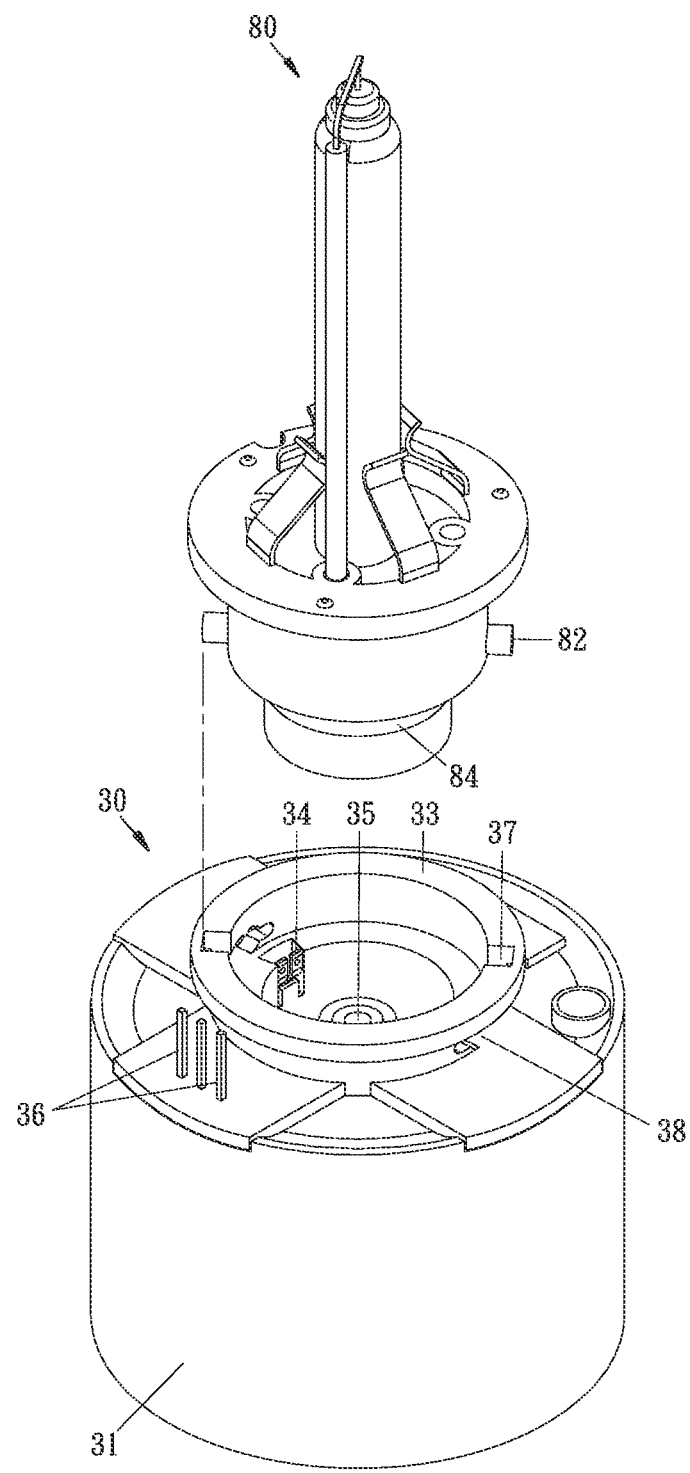
FIG. 7 is a perspective view to show the ballast structure depicted in FIG. 3 and an HID lamp to be installed on the ballast.

Referring to FIGS. 3, 4, and 7, the HID lamp seat 32 includes a fastening seat 33, an electrode contact plate 34 and an electrode insertion hole 35. The fastening seat 33 of the HID lamp seat 32 is provided on the top surface of the base 31 and forms a receiving space 33a in which the HID lamp 80 can be installed. The electrode contact plate 34 and the electrode insertion hole 35 are elements of opposite polarities, or more particularly a positive-electrode element and a negative-electrode element. The electrode contact plate 34 and the electrode insertion hole 35 are electrically connected to the positive-electrode and negative-electrode output ends of the AC rectifier circuit 31b and of the ignition circuit 31c in the base 31.

According to a preferred embodiment of the ballast structure 30, the electrode contact plate 34 of the HID lamp seat 32 is provided on a lateral surface of the receiving space 33a formed by the fastening seat 33. Meanwhile, the electrode insertion hole 35 is protrudingly provided on a bottom portion of the receiving space 33a.

In order to keep the HID lamp 80 tightly fastened after it is installed on the ballast structure 30, the top surface of the fastening seat 33 of the HID lamp seat 32 is provided with at least two longitudinal grooves 37 which correspond to the fastening lugs 82 of the HID lamp 80 respectively. In addition, a lateral surface of the fastening seat 33 is provided with transverse fastening grooves 38 which communicate with the longitudinal grooves 37 respectively.

Figure 8:
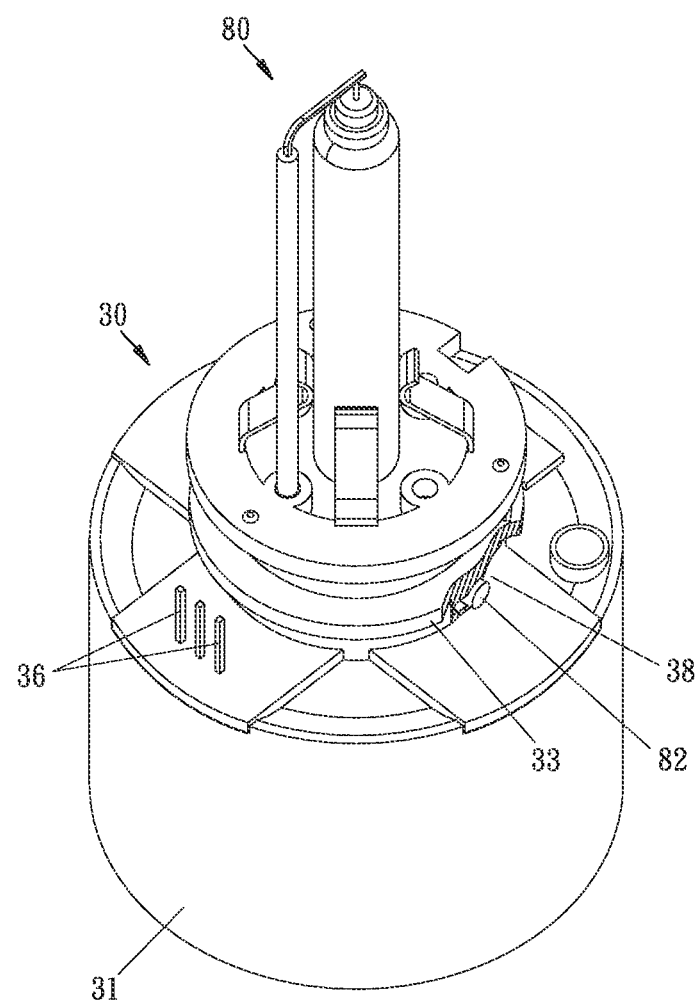
FIG. 8 is a perspective view of the ballast structure depicted in FIG. 3 and an HID lamp in the assembled state, in which the HID lamp is tightly fastened with the ballast structure.

The process of installing the HID lamp 80 onto the ballast structure 30 of the present invention is now described with reference to FIGS. 7 and 8. To begin with, the fastening lugs 82 of the HID lamp 80 are aligned with the longitudinal grooves 37 of the ballast structure 30 respectively. Then, the HID lamp 80 is inserted and installed in the receiving space 33a of the lamp seat 32. By turning the HID lamp 80, the fastening lugs 82 of the HID lamp 80 are fastened in the transverse fastening grooves 38 of the fastening seat 33 of the HID lamp seat 32 respectively. Thus, installation of the HID lamp 80 is completed.

Figure 9:
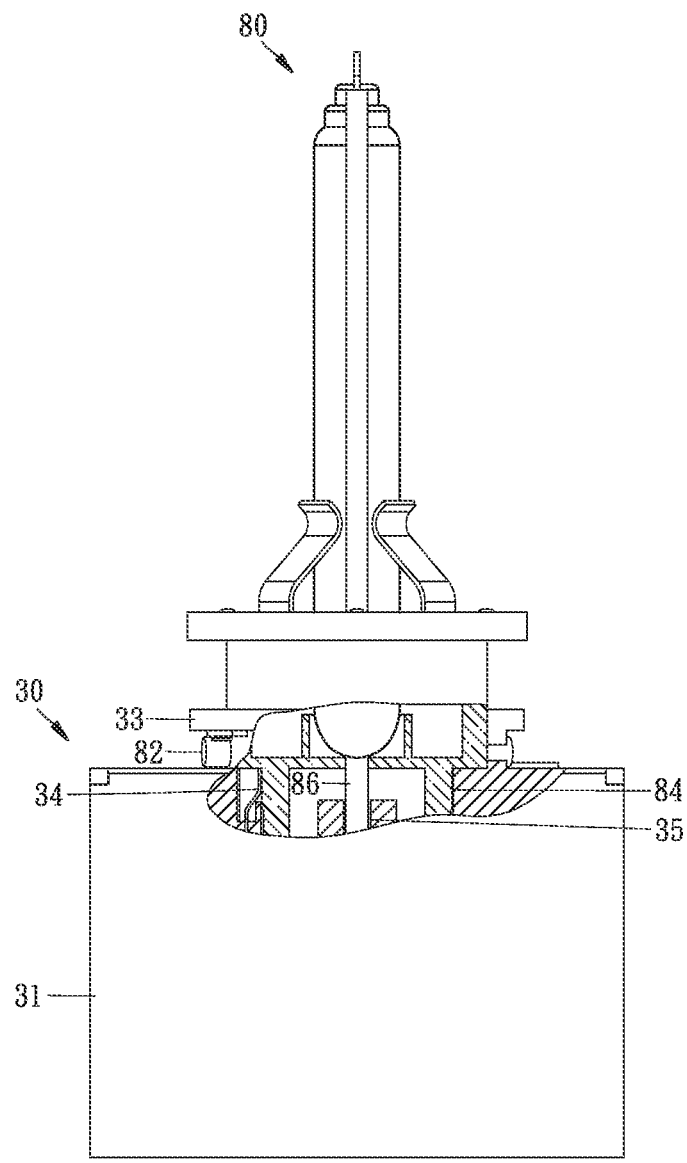
FIG. 9 is a partially sectional front view of the ballast structure depicted in FIG. 3 and an HID lamp in the assembled state, in which the ballast and the HID lamp are electrically connected.

As shown in FIGS. 7 and 9, once the HID lamp 80 is installed on the ballast structure 30 of the present invention, the electrode contact plate 34 of the HID lamp seat 32 of the ballast structure 30 is electrically connected to the annular electrode 84 of the HID lamp 80. Also, the electrode insertion hole 35 of the HID lamp seat 32 is electrically connected to the pin electrode 86 of the HID lamp 80. A DC power input via the power input port 36 of the ballast structure 30 will flow through the circuits in the base 31 and the HID lamp seat 32 to start and light the HID lamp 80 and keep the lit HID lamp 80 in operation normally.

What is claimed is:

1. A ballast structure, comprising a base which is provided with a direct-current (DC) boost circuit, an alternating-current (AC) rectifier circuit and an ignition circuit, and said circuits being arranged to form a circuit functioning as a ballast, wherein the base is further provided with a high-intensity discharge lamp (HID lamp) seat composed of a fastening seat, an electrode contact plate and an electrode insertion hole, the fastening seat forming a receiving space in which an HID lamp can be installed, wherein the electrode contact plate and the electrode insertion hole are a positive-electrode element and a negative-electrode element respectively, or vice versa, and are electrically connected to positive-electrode and negative-electrode output ends of the AC rectifier circuit of the base.

2. The ballast structure of claim 1, wherein the base is further provided with a control circuit for detecting a working condition of the HID lamp and adjusting an output voltage and an output current of the AC rectifier circuit in a timely manner according to the working condition of the HID lamp.

3. The ballast structure of claim 2, wherein the base is shaped as a cylinder, a triangular prism, a rectangular prism, or other polygonal prisms.

4. The ballast structure of claim 2, wherein the base is provided with a power input port which is exposed and electrically connected to positive-electrode and negative-electrode input ends of the DC boost circuit of the base.

5. The ballast structure of claim 2, wherein the fastening seat of the HID lamp seat has a top surface provided with at least two longitudinal grooves.

6. The ballast structure of claim 5, wherein the fastening seat of the HID lamp seat has a lateral surface provided with transverse fastening grooves respectively in communication with the longitudinal grooves.

7. The ballast structure of claim 1, wherein the base is shaped as a cylinder, a triangular prism, a rectangular prism, or other polygonal prisms.

8. The ballast structure of claim 1, wherein the base is provided with a power input port which is exposed and electrically connected to positive-electrode and negative-electrode input ends of the DC boost circuit of the base.

9. The ballast structure of claim 1, wherein the fastening seat of the HID lamp seat has a top surface provided with at least two longitudinal grooves.

10. The ballast structure of claim 9, wherein the fastening seat of the HID lamp seat has a lateral surface provided with transverse fastening grooves respectively in communication with the longitudinal grooves.

* * * * *